April 28, 1959 T. T. BRYEN 2,884,298
METHOD AND APPARATUS FOR TREATING GAS-FILLED TUBES
Filed Sept. 24, 1956 4 Sheets-Sheet 2
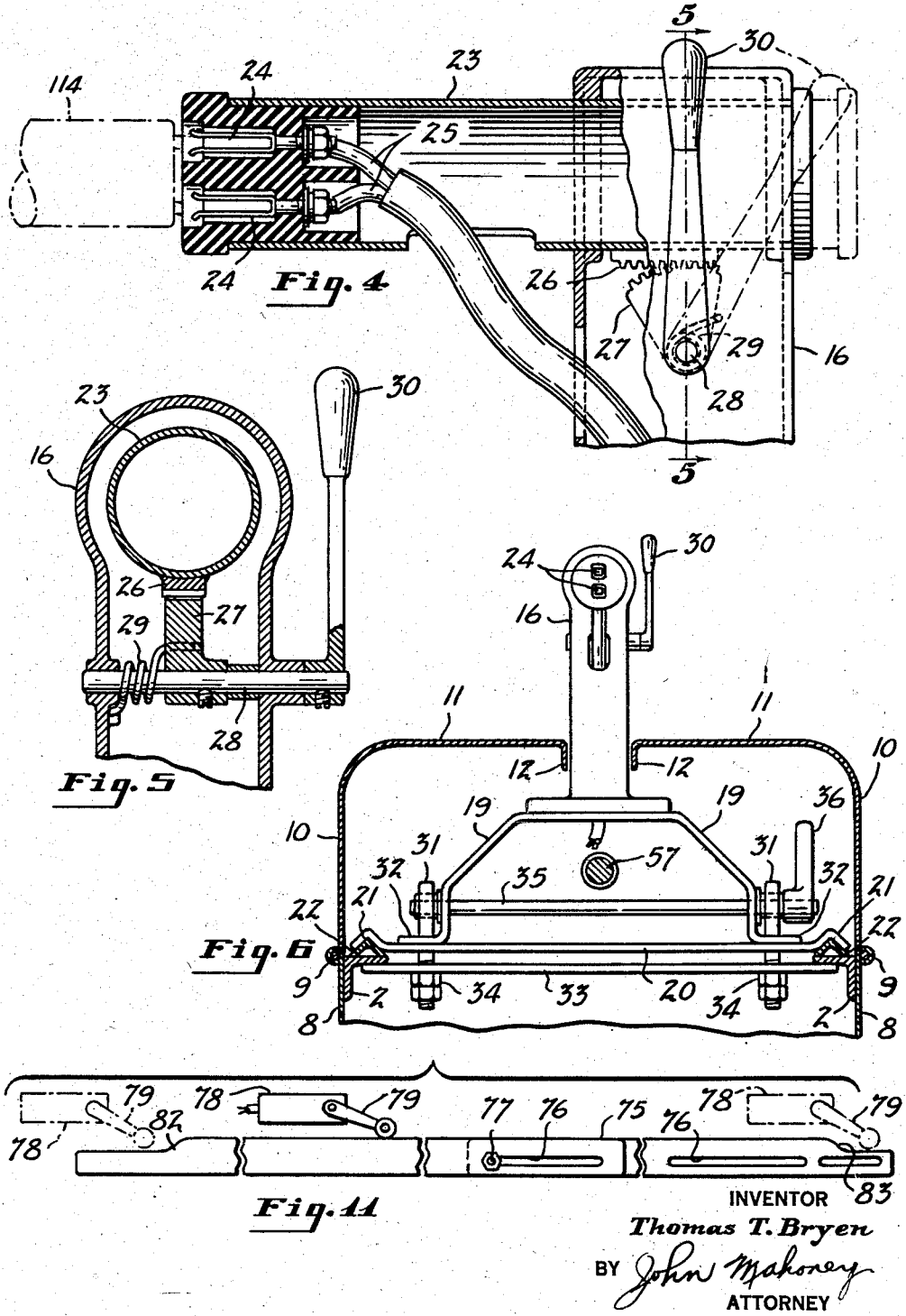
INVENTOR
Thomas T. Bryen
BY John Mahoney
ATTORNEY

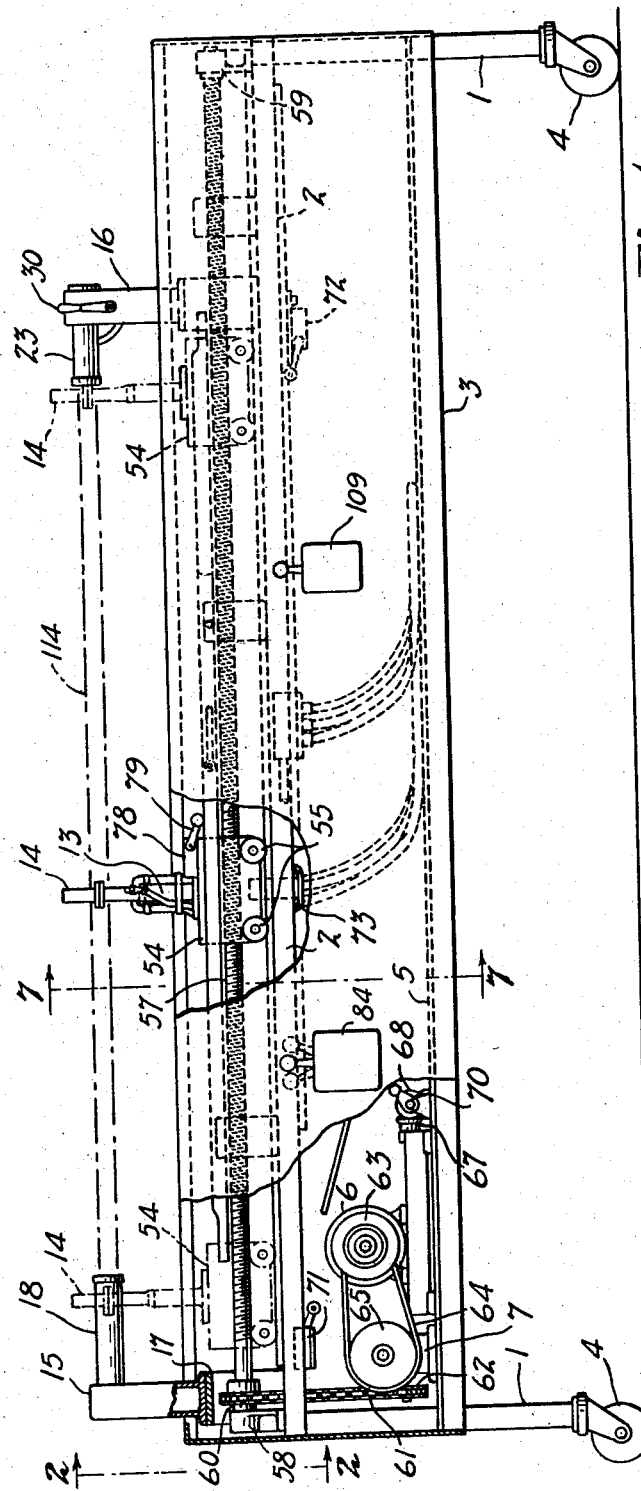

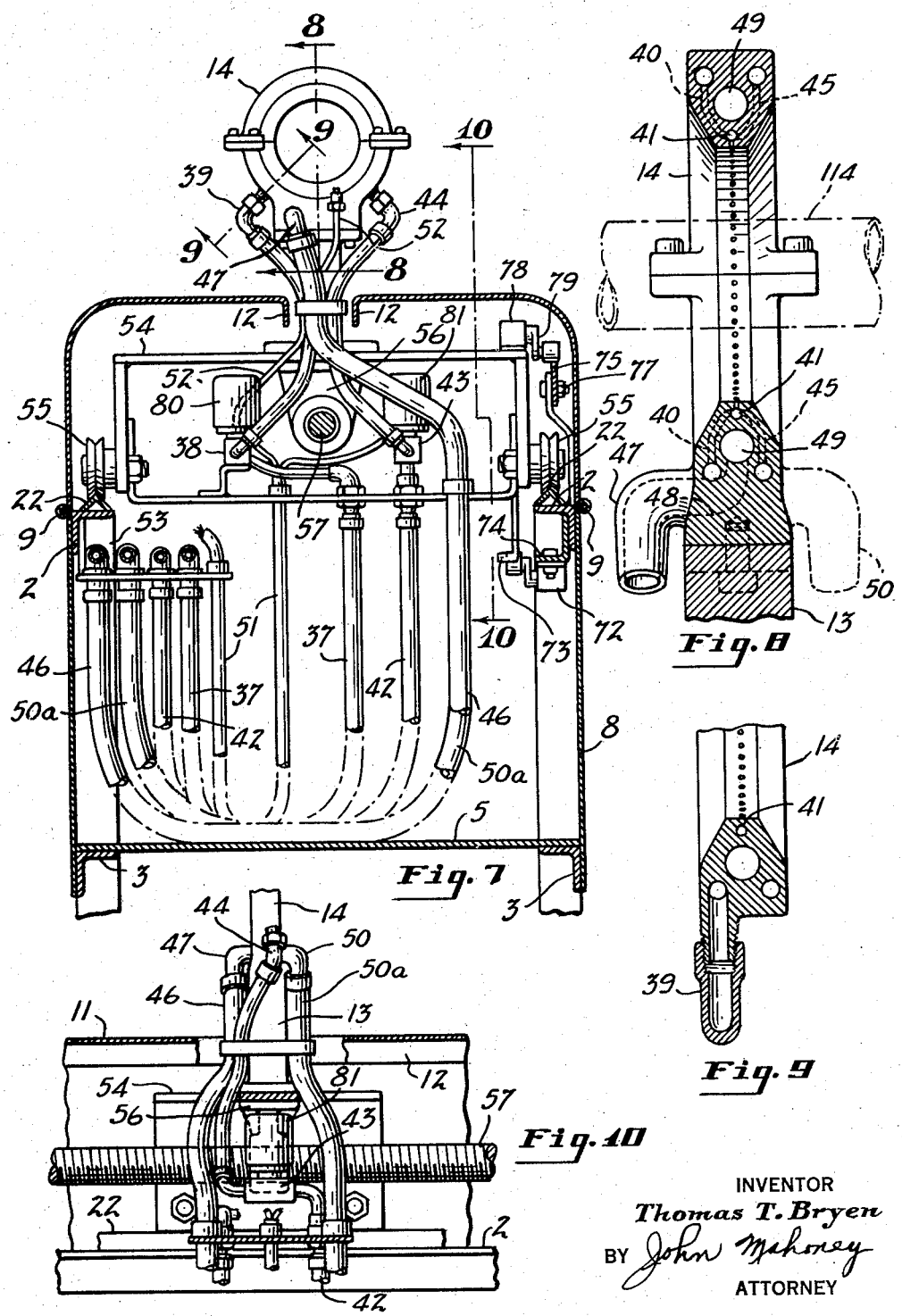

INVENTOR
Thomas T. Bryen
BY John Mahoney
ATTORNEY

United States Patent Office 2,884,298
Patented Apr. 28, 1959

2,884,298

METHOD AND APPARATUS FOR TREATING GAS-FILLED TUBES

Thomas T. Bryen, Cleveland, Ohio

Application September 24, 1956, Serial No. 611,465

2 Claims. (Cl. 316—2)

The present invention relates to gas-filled tubes and more particularly to a method of and an apparatus for treating gas-filled tubes of the fluorescent type which have become blackened in service to restore them to a condition in which they will emanate substantially the same amount of light as new tubes.

As presently constructed, lamps of the gas-filled type, such as fluorescent lamps, include as a part of each lamp a glass tube, the inner wall of which is coated with a material having fluorescent or phosphorescent properties, such as calcium tungstate, magnesium tungstate, or zinc beryllium silicate. The tube is also provided at each end with an electrode including a filament preferably formed of tungsten which is usually coated with a mixture of barium and strontium oxides, or with a mixture of barium and strontium oxides and a small amount of zirconia or powdered zirconium.

In preparing fluorescent tubes, it is the practice to coat the filament of the electrodes with a suspension of barium and strontium carbonates, or with a suspension of strontium and barium carbonates and zirconia or powdered zirconium in which suspension the coils are dipped and when the coils are heated to activate them in service, the carbonates are decomposed to form a coating consisting of a mixture of barium and strontium oxides, or a mixture of barium and strontium oxides and zirconia or zirconium. There is also enclosed in the tubes a small amount of mercury and an inert gas, such as argon, krypton, or a mixture of argon and krypton, and when an electric current is passed between the electrodes, ultra-violet radiations are produced which are transformed by the fluorescent material into visible light.

The complete failure of gas-filled tubes, unless defects are present in their mechanical parts, is generally due to the sputtering off of all of the coating upon the filaments of the electrodes. However, it is well known that gas-filled tubes of the fluorescent type gradually blacken in service even when the coating of the oxides upon the filaments is still intact. The blackening of the tubes is particularly pronounced at the end portions of the tubes in proximity to the electrodes although more or less blackening of the tubes occurs throughout the entire length of the tubes. This blackening is caused by a film comprising mercury which is deposited upon the interior surface of the tube during service in which the mercury may be entrained with or combined with other elements or compounds on the interior surface of the tube.

The gradual blackening of the tubes in service is not only a source of annoyance to the users of the lamps because of the decrease in light that the lamps provide but it causes a severe economic loss because the same amount of power is required to operate a lamp in which the tube has become blackened in service as that required when the tube was first installed and consequently there comes a time within the life of a tube when the further operation of the lamp becomes uneconomical and in such case, it has heretofore between the practice to discard the tube although all of its mechanical parts are still in good working condition.

It is the aim of the present invention to provide an improved process of treating gas-filled tubes which have become blackened in service to remove the blackening from the tubes and to restore them to their original state. I have also provided improved apparatus which may be utilized in factories, office buildings, and the like, to restore to their original state gas-filled tubes which have become blackened in service to such an extent that they are no longer economical to utilize or which because of such blackening do not provide the requisite amount of light.

In accordance with my invention, I have found that if the exterior surface of a gas-filled tube that has become blackened in service is heated to a comparatively high temperature, the material formed upon the interior surface of the tube that causes the blackening of the tube will be removed and the tube will be restored to a condition in which it will provide substantially the same amount of light as a new tube and although in accordance with my invention, the blackening from the interior surface of the tube may be removed without lighting the tube, I preferably provide means for passing a current through the tube to illuminate it during the treating process so that the removal of the material which causes the blackening of the tube may be clearly observed. Improved apparatus is also provided in which the source of heat may be applied around an annular portion of the tube and may be moved along the tube at a constant rate of speed, or may be first moved along the tube and then moved alternately in opposite directions in proximity to those portions of the tube in which the blackening is more pronounced than in the other portions of the tube.

It is therefore an object of the present invention to provide an improved apparatus for restoring to their original state gas-filled tubes of the fluorescent type that have become blackened in service.

Another object of the invention is to provide improved apparatus including a ring-shaped burner for impinging a flame of sufficient heat intensity around an annular portion of a fluorescent tube to remove the blackening from the interior surface of that portion of the tube and in which means are provided to continuously change the relative positions of the burner and the longitudinal portions of the tube which are subject to heat at sufficient speed to prevent melting of the glass of which the tube is composed.

A further object of the invention is to provide improved apparatus including a ring-shaped burner for impinging a flame of sufficient intensity around an annular portion of an elongated fluorescent tube to remove the blackening from the interior surface thereof and in which means are provided for continuously changing the relative positions of the burner and longitudinal portions of the tube that are subject to heat at sufficient speed to prevent melting of the glass of which the tube is composed, and in which means are also provided for regulating the speed at which the relative positions of the tube and the burner are changed depending upon the heat intensity of the flame.

A still further object of the invention is to provide an improved apparatus for supporting a fluorescent tube and subjecting an annular portion of the tube to the flame of an annular burner having sufficient heat intensity to remove the blackening from the annular portion of the tube that is subjected to heat while passing a current through the tube to cause it to emanate light and in which means are provided for continuously changing the relative positions of the burner and the annular portion of the tube that is subjected to heat at sufficient speed to prevent melting of the glass of which the tube is composed.

My invention will be better understood by reference to the accompanying drawings in which:

Fig. 1 is a side elevational view of my improved apparatus with parts broken away to show adjacent structure;

Fig. 2 is an end view as seen from a plane passing through line 2—2 of Fig. 1 with parts broken away;

Fig. 3 is a plan view with parts broken away of a motor and reducing gearing for driving the shaft which supports the burner;

Fig. 4 is a detail view showing the connection of electrical conductors with the electrodes of the tube;

Fig. 5 is a cross sectional view on the line 5—5 of Fig. 4, looking in the direction of the arrows;

Fig. 6 is a cross sectional view through the hood of the apparatus showing the adjustable tube supporting means in elevation;

Fig. 7 is a sectional view taken on a plane passing through the line 7—7 in Fig. 1 looking in the direction of the arrows;

Figure 12:
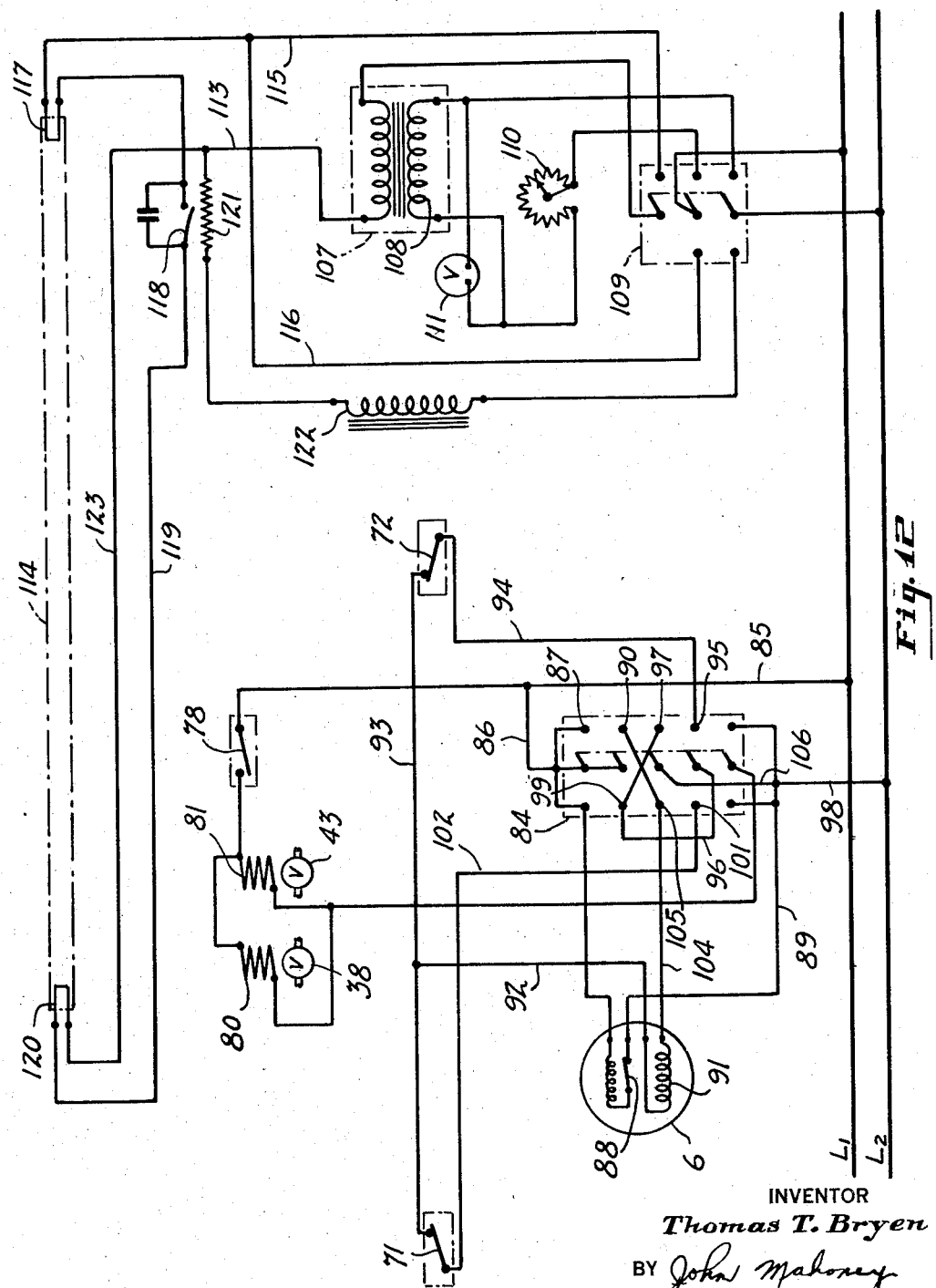

Figs. 8 and 9 are cross sectional views taken on planes passing through the lines 8—8 and 9—9 of Fig. 7, respectively, looking in the direction of the arrows;

Fig. 10 is a sectional view taken on a plane passing through the line 10—10 of Fig. 7, looking in the direction of the arrows;

Fig. 11 is a detail view showing the manner in which an electrical circuit is established for energizing the solenoids in the valves through which fuel is supplied to the burner; and Fig. 12 is a wiring diagram of an electrical system that may be utilized in connection with the apparatus.

In accordance with my invention, a gas-filled tube, such as the tube of a fluorescent lamp that has become blackened in service, is supported in any desired manner and the external surface of the tube is heated by any suitable means capable of developing an intense heat which heat may be conducted to the tube through the air or as shown, the source of heat may be a burner capable of producing a flame which is passed in close proximity to the tube. The intensity of the heat should not be sufficient, however, to melt the glass of which the tube is formed during the time that the heat is applied and preferably the burner is constructed in such a manner that the source of heat will encircle an annular portion of the tube and may be slowly moved along the tube throughout its length although in accordance with my invention, the burner may be first moved slowly along the tube and may then be moved back and forth over those portions of the tube in proximity to the electrodes which blacken in service to a greater extent than at other portions of the tube, or if desired, a horizontal burner may be provided and the tube may be rotated during the heating process. As previously stated, the burner may be of any desired type to receive a mixture of gases, at least one of which is combustible, such as illuminating gas mixed with air, a petroleum product, such as propane or ethane mixed with air, or when a higher temperature is desired, I may provide a flame produced from a mixture of oxygen and hydrogen or a mixture of oxygen and acetylene. The heat provided should be sufficient to remove the blackening from the interior surface of the tube but should not be sufficient to melt or soften the glass of which the tube is composed during the time that any portion of the tube is exposed to the gas flame and in this connection it may be stated that the melting point of the glass tubes which are utilized in fluorescent lamps is approximately 1430° C. To remove the blackening from the interior surface of the tube, I have found that a source of such high heat intensity is required that if any portion of the tube were subjected to the flame for an extended period of time, the flame would melt the glass of which the tube is composed. It is therefore necessary to impinge the flame upon an annular portion of the tube and to continuously change the relative positions of the burner and the annular portions of the tube upon which the flame is impinged until the blackness is removed from the interior surfaces of all portions of the tube and the change in the relative positions of the burner and the annular portions of the tube upon which the flame is impinged must be at sufficient speed to prevent melting of the glass of which the tube is composed. Obviously, the temperature of the flame provided to heat the tube will depend upon the mixture of gases that is utilized to provide the fuel and may vary from approximately 1500° C. to 3100° C. To provide a flame having a temperature of approximately 1500° C. a mixture of illuminating gas and air may be utilized. A flame having a higher temperature ranging from approximately 1500° to 2000° C. may be provided from a mixture of a petroleum product, such as methane, propane or ethylene and air, and to provide a flame having a still higher temperature, such as from approximately 2000° to 3100° C. a mixture of hydrogen and oxygen may be utilized for the lower temperatures within this range and a mixture of oxygen and acetylene may be utilized for the higher temperatures within this range. During the heating process, the relative positions of the burner and the tube are changed and to expedite the process I preferably utilize a mixture of gases which provide a flame having a temperature of approximately 1500° to 3100° C. while maintaining the burner at a short distance from the fluorescent tube, such as approximately one-half to one inch depending upon the size of the tube. I have found that the comparatively high heat applied to the external surface of the tube not only removes the blackening from the interior surface of the tube but it also serves to rejuvenate tubes in which the coating on the filament is still intact but which have failed in service.

In accordance with my invention, improved apparatus is also provided for supporting tubes of various lengths, for moving a heating means, such as a burner relative to the tubes, for supplying fuel to the burner, and for passing current at a normal voltage through the tube to illuminate it while it is being treated, and while the apparatus may assume various forms, as illustrated in Fig. 1 of the drawing, a portable apparatus is provided consisting of a rectangular frame comprising downwardly extending legs 1 which are secured together at their upper ends by side and end angle irons 2 and intermediate its ends by side and end angle irons 3. The legs 1 extend below the lower side and end angle irons and are preferably provided with castors 4 so that the apparatus may be readily moved to any portion of a factory or building.

To provide a support for the working parts of the apparatus, a panel 5 is arranged upon the inwardly extending side flanges of angle irons 3 upon which is mounted a motor 6 and suitable reducing gearing 7.

To protect the motor and other working parts of the apparatus and to provide a support for the hand operated switches, means are provided for at least partly enclosing the upper portion of the frame. For this purpose, a hood is provided consisting of two similar parts, each of which has a side wall 8 secured to the frame between the side flanges, to each of which is hinged at 9 a hood portion consisting of an upwardly extending side wall 10 which is bent inwardly at its upper portion as indicated by the numeral 11 and terminates in a downwardly extending flange 12 which flanges are spaced from each other to receive the upwardly extending arm 13 of a burner 14.

In accordance with my invention, means are provided to support fluorescent tubes of various lengths in place and for this purpose, a stationary bracket 15 and a movable bracket 16 are provided. The stationary bracket 15 is arranged at one end of the apparatus, the lower portion of which is supported on a frame 17 extending upwardly from the inwardly extending flanges of angle irons 2. The bracket 15 serves to support a tubular conduit means 18 provided with electrically conductive sockets for engaging the terminals of the electrode at one end of the fluorescent tube and the frame 17, bracket 15 and the tubular conduit means 18 are provided with openings for receiving electrical conductors which are electrically connected to the sockets which sockets are shown more particularly in Fig. 4.

The movable bracket 16 as shown in Figs. 4 to 6 is supported on a frame 19 secured to a base plate 20 which is provided at its opposite ends with V-shaped grooves 21 which are slidable upon angularly shaped tracks 22 secured to the inwardly extending side flanges 2 of the frame. The bracket 16 extends upwardly through the slot formed by the flanges 12 and supports conduit means 23, and bracket 16 and conduit means 23 are provided with openings for receiving electrical conductors 25 which are connected to sockets 24 for receiving and making electrical contact with the terminals at the opposite end of the fluorescent tube.

To enable tubes of the same length to be readily inserted between the stationary and movable sockets, the tubular conduit means 23 is movable relative to the bracket 16. For this purpose, the conduit means is provided at its lower portion with a rack 26 which meshes with a segmental gear 27 secured to a shaft 28 extending through the bracket 16 and conduit means 23 is urged inwardly by a spring 29, one end of which is secured to a wall of the bracket and the other end of which engages segmental gear 27. To enable a fluorescent tube which has been treated by my improved process to be removed from the apparatus, shaft 28 is provided with a handle 30 by means of which conduit means 23 may be moved outwardly against the force of spring 29 and after an additional tube has been inserted in place, handle 30 is released and spring 29 moves the conduit means 23 back in place to support the second tube in place.

Means are also provided to set the bracket 16 and the tubular conduit means 23 in different positions on the track 23. For this purpose, a pair of eye bolts 31 are provided, the shanks of which extend through openings in outwardly extending flanges 32 on frame 19, the base plate 20, and a plate 33 having its opposite edges engaging the inwardly extending flanges of angle iron 2. Each of the eye bolts is provided with nuts 34 arranged below the plate 33 and a shaft 35 extending across frame 19 is provided at one end with a handle 36 and with cams arranged in the eyes of the bolts and when the handle 36 is in one position, the plate 20 may be slid upon the rails 22. When the handle 36 is turned, however, the cams engage and tighten the bolts 31 and maintain frame 19 and bracket 16 in stationary positions.

When the tube is supported in position between the sockets, its external surface may be heated by any suitable means, such as a burner 14 which surrounds the tube and has a plurality of small spaced openings arranged around its inner periphery through which a mixture of gases may issue, at least one of which is combustible.

In accordance with my invention, means are provided for supplying a mixture of gases to the burner, such as a mixture of the gases previously specified. As shown, one of the gases, such as acetylene, is passed through a flexible tube 37 provided with a solenoid operated valve 38 and communicates through a connector 39 with conduit means 40 arranged in the burner which leads to a mixing chamber 41 and the other gas which may be oxygen, is conducted through a flexible pipe 42 which is provided with a solenoid operated valve 43 and communicates through a connector 44 and conduit means 45 with the mixing chamber 41 and when a mixture of gases is utilized which provides upon combustion such temperatures that might melt the metal of which the burner is composed, a cooling fluid, such as water, is passed through a flexible tube 46 to a connector 47 arranged on one side of the burner and conduit means 48 leading to an annular passage 49 in the burner and then passes through a connector 50 arranged on the opposite side of the burner to a flexible outlet pipe 50a. The passageway in the burner is of course provided with a closed section to separate the inlet and outlet passageways for the water. A flexible conduit means 51 is also provided containing conductors for energizing the solenoids associated with the valves which valves are normally maintained in a closed position by suitable means, such as springs, and a flexible tube 52 is provided for conducting a small amount of the inflammable gas, such as acetylene, in proximity to the burners. The flexible tube 52 by-passes the solenoid valve 38 and provides a pilot light for igniting the mixture of gases when the solenoid valves are open. The flexible tubes may be supported within the hood in any desirable manner, such as by means of a bracket 53 extending downwardly from one of the angle irons 2.

As previously stated, the arm of the burner extends through the slot formed by the spaced flanges 12 of the hood and is supported on a carriage 54 provided with oppositely disposed wheels 55 which ride upon tracks or guide ways 22 and means are provided to alternately move the carriage and burner in opposite directions and to energize the solenoids in the valves during the movement of the burner to provide the desired amount of heat. For this purpose, the carriage 54 is provided with a downwardly extending plate 56 having a threaded opening therein through which is threaded a shaft 57, the opposite ends of which shaft are journalled in bearings 58 and 59 arranged within the hood at opposite ends of the frame and are supported by and extend upwardly from the inwardly extending flanges on end angle irons 2. The shaft 57 is provided with a pulley 60 adjacent bearing 58 and a belt 61 is trained around the pulley 60 and a pulley 62 extending from the speed reducer 7. The motor 6 is reversible and when its shaft is rotated in one direction, the carriage 54 and burner 14 is moved in one direction and when the motor is reversed, its shaft rotates in the opposite direction to move the carriage and burner in the opposite direction.

The speed at which the threaded shaft is rotated may be regulated in any desired manner. As shown, the shaft of motor 8 is provided with conically shaped pulley parts 63, the outer part of which is urged toward the inner part by means of a spring, not shown, and a belt 64 is trained between pulley parts 63 and over a pulley 65 on the speed reducer and to vary the speed at which the belt 64 travels to rotate the pulley 65, a threaded shaft 66 mounted in the base of the motor is provided with a gear 67 at its outer end which meshes with a gear 68 on a shaft 69 which extends outwardly through the hood and is provided with a crank 70 and when motor 6 is moved to the right as shown in Fig. 3, the belt forces pulley parts 63 from each other and moves downwardly in the groove between the pulley parts, thereby decreasing the speed imparted to the pulley on the reducing mechanism and when the motor is moved to the left, the belt is forced upwardly between the pulley parts 63 and the speed at which the belt which drives the pulley on the speed reducer is increased. The rate at which the burner is moved relative to the tube depends of course upon the temperature of the flame which issues from the burner but should be sufficient to prevent softening or melting of the glass of which the tube is composed. When the temperature of the flame is relatively low, it is apparent that the movement of the burner relative to the tube may be at a slower rate than when the temperature of the flame is high. As previously stated, however, to remove the blackening from the interior surface of the tube, it is necessary to provide a flame having a comparatively high temperature, such as a temperature above the melting point of the glass of which the tube is composed. When a fuel consisting of a mixture of oxygen and acetylene is used, the burner may be moved relative to the tube at the rate of approximately six to ten feet per minute.

Means are also provided to limit the movement of the carriage in opposite directions. For this purpose, a pair of switches 71 and 72 are provided. Switch 71 is supported by a bracket secured to the downwardly extending flange of angle iron 2 and is actuated by a downwardly extending arm 73 on the carriage which engages an actuating arm on the switch when the carriage is moved to the left as shown in Fig. 1, thereby interrupting the circuit to motor 8 and limiting the movement of the carriage to the left.

For supporting limit switch 72, an angle iron has a flange secured to the side angle iron 2 and an inwardly extending flange 74 which is provided with spaced apertures throughout its length and the switch may be supported in any desired manner, such as by bolts extending through the apertures in outwardly extending flanges on the box of the switch. Switch 72 may be set in any desired position depending upon the length of the gas-filled tube being treated and is actuated by arm 73 to interrupt the circuit to the motor when the carriage is traveling toward the right as shown in Fig. 1.

Means are also provided during the travel of the carriage to energize the solenoids to open the valves which control the passage of gas through pipes 37 and 42. For this purpose, a rail 75 is secured to spaced brackets extending upwardly from angle iron 2 and consists of parts provided with slots 76 through which one or more bolts 77 may be inserted to vary the length of the rail and a switch 78 supported by the carriage is provided having an arm 79 which closes switch 78 and energizes solenoids 80 and 81, see Fig. 12, associated with the stems of valves 38 and 43 when arm 79 is in engagement with the upper edge of rail 75 to open valves 38 and 43, thereby permitting gases to pass to the burner 14. As shown more particularly in Fig. 11, the rail is provided with cam-shaped end portions 82 and 83 and when the carriage reaches a position in which the actuating arm passes from the raised portion of the rail downwardly over either of the cam surfaces of the rail 75, switch 78 automatically opens and the circuit to the solenoids associated with the stems of the valves is interrupted. The valves through which fuel is supplied to the burner then close.

The operation of the apparatus will be more clearly understood by reference to the wiring diagram shown in Fig. 12. Assuming the carriage 54 is at the left end of the track as shown in dotted lines in Fig. 1 of the drawings and arm 73 of the carriage is in engagement with and holds the actuating arm of limit switch 71 in a position to maintain switch 71 in its open position, to start the motor, a hand operated switch 84 is thrown to the right as shown in Figs. 1 and 12.

Switch 84 is a five pole double throw switch which when moved to the right as shown in Figs. 1 and 12, establishes a circuit from line $L_1$ through conductors 85 and 86 and terminal 87 to the starting switch 88 of motor 6 and to line $L_2$ through conductor 89. A second circuit is also established from line $L_1$ through conductors 85 and 86 and terminal 90 to the windings 91 of motor 6 and through conductors 92 and 93 to limit switch 72 and from limit switch 72 through conductor 94 to terminal 95 and from terminal 95 through switch 84 and conductor 96 to terminal 97 and from terminal 97 through conductor 98 to line $L_2$. Switch 88 of the motor is of the centrifugal type and is thrown to its open position by centrifugal force after the motor is started and limit switches 71 and 72 are of a type which automatically closes when pressure is released from the actuating arm of the switch. The motor when energized moves the carriage toward the right and after the actuating arm 73 on the carriage is moved from the arm of switch 71, switch 71 automatically closes. A third circuit is also established from line $L_1$ through conductor 85 and switch 78 to solenoids 80 and 81 associated with the stems of valves 38 and 43 when the arm 79 of switch 78 is moved to a position in which it rides upon the upper edge of rail 75, thereby opening valves 38 and 43 and fuel flows to the burner and is ignited by the pilot light to heat the external surface of the tube. After the carriage moves a predetermined distance depending upon the length of the fluorescent tube being treated, arm 79 of switch 78 rides over cam 83 and switch 78 opens to interrupt the circuit to solenoids 80 and 81, thereby shutting off the supply of fuel to the burner and when the arm 73 on the carriage strikes the arm of limit switch 72, the circuit to the motor is also interrupted.

To return the carriage to its original position, switch 84 is moved to the left as shown in Figs. 1 and 12, and a circuit is established from line $L_1$ through conductors 85 and 86 to starting switch 88 and a second circuit is established from line $L_1$ through conductors 85 and 86 to terminal 99 and from terminal 99 through conductor 96 to terminal 101 and from terminal 101 through conductor 102 to limit switch 71 and from limit switch 71 through conductor 92 to the winding 91 of motor 6 and through conductor 104 to terminal 105 and from terminal 105 through conductor 106 to line $L_2$. The rotation of the shaft of the motor is thus reversed and carriage 54 and burner 14 are moved to the left as shown in Fig. 1 and when arm 79 of switch 78 rides upon the upper edge of rail 75, a circuit is established from line $L_1$ to energize solenoids 80 and 81 associated with valves 38 and 43 to open the valves and supply fuel to the burner. When arm 79 of switch 78 passes over the cam-shaped portion 82 of rail 78, however, the circuit to switch 78 is interrupted, valves 38 and 43 close, and the supply of fuel to the burner is terminated and when the carriage reaches the forward end of its travel, arm 73 opens switch 71 and interrupts the circuit to the motor.

Because limit switches 71 and 72 automatically close when the actuating arm 73 is disengaged therefrom, it is apparent that when the arm 79 of switch 78 is riding upon the upper edge of rail 75, fuel will be supplied to the burner and by moving switch 84 back and forth to forward and reverse positions as shown in Fig. 12, the carriage and burner may be moved back and forth over those portions at the ends of the fluorescent tube that are blackened to a greater extent than other portions of the tube. As shown in Fig. 1, switch 84 is arranged adjacent one of the side walls of the hood in a position in which it is easily accessible for hand operation.

While it is not essential, a current at a high voltage may be passed through the tube before it is externally heated to remove the blackening from the interior surface of the tube. It is also desirable to pass current at ordinary voltage through the tube to light the tube during the external heating process so that the removal of the blackening from interior surface of the tube may be more clearly observed.

For passing a high voltage through the tube before externally heating the tube, a transformer 107 is provided as shown in Fig. 12, the primary winding 108 of which is connected to the line $L_1$ and $L_2$ when a switch 109 is moved to the right as shown in Figs. 1 and 12. The primary winding of the transformer is provided with an adjustable resistor 110 and a voltmeter 111 and the secondary winding is wound to provide a comparatively high voltage, such as approximately 7500 volts, and when switch 109 is moved to the right as shown in Figs. 1 and 12, a circuit is established from one terminal of the secondary winding through conductor 113, the tube 114, a conductor 115, and switch 109 to the other terminal of the secondary winding. The current which is passed through the tube at high voltage should be of comparatively short duration and if desired electrical means responsive to the closing of switch 84 may be provided to move switch 109 to the right for a relatively short period of time, such as a fraction of a second. As shown in the drawings, switch 109 may be thrown to the right by hand to provide a current at a high voltage through the tube and is then immediately released. The hand operation does not require more than a few seconds.

I also preferably light the tube before applying external heat to the outer surface of the tube and in this connection it may be stated that the tubes being treated may be of any type now utilized in electric lamps of the fluorescent type and may be lighted in any desired manner known in the art. For purpose of illustration, a fluorescent tube having two electrodes extending from each end is shown and for passing a current through the tube at normal voltage, such as 120 volts, to cause it to emanate light, switch 109 may be moved to the left as shown in Figs. 1 and 12 to establish a circuit from line $L_1$ through conductor 116, electrode 117, a bimetal starting switch 118 which is normally maintained in a closed position when the tube is dark, a conductor 119 to electrode 120 and from electrode 120 through conductor 123 to a resistor 121 and from resistor 121 through a ballast 122 to line $L_2$. The current passing through resistor 122 heats the bimetallic switch and causes it to open and when switch 118 opens the ballast 122 provides an inductive kick and a circuit is established from line $L_1$ through conductor 116, electrode 117, fluorescent tube 114 and through conductor 123, resistor 121 and ballast 122 to line $L_2$.

What is claimed is:

1. The process of treating a fluorescent tube that has become blackened in service which comprises applying heat around the tube at a local circumferential zone and at such a temperature intensity that would melt the glass of the tube if it momentarily remained in situ and moving the source of heat along the entire length of the tube by relative movement of the tube and source of heat at such a rate of speed that the heat will remove blackening from the interior surface of the tube before the zone of the tube is melted.

2. A machine for removing the blackening from a fluorescent tube comprising a frame, spaced supports on said frame for supporting the ends of a tube, guideways at least as long as the space between said supports running the length of a tube and parallel to the axis thereof, a carriage movable along said guideways, a circular heat applying means adapted to surround a tube coaxial therewith, means to apply heat by said means at such an intensity as to melt the glass of the tube if the carriage remained momentarily in situ, a power drive, and means driven by said power drive to move the carriage the length of the tube at such a constant rate that melting of the tube is avoided.

References Cited in the file of this patent

UNITED STATES PATENTS

| | | |
|---|---|---|
| 2,073,190 | Bartlett et al. | Mar. 9, 1937 |
| 2,304,714 | Stringer | Dec. 8, 1942 |
| 2,324,390 | Heiliger | July 13, 1943 |
| 2,413,707 | Helliar | Jan. 7, 1947 |
| 2,452,401 | Stivin | Oct. 26, 1948 |
| 2,733,973 | Palton | Feb. 7, 1956 |
| 2,774,645 | Batchelor | Dec. 18, 1956 |

FOREIGN PATENTS

| | | |
|---|---|---|
| 216,396 | Great Britain | June 4, 1924 |